US008801840B2

(12) United States Patent
Sugiura et al.

(10) Patent No.: US 8,801,840 B2
(45) Date of Patent: Aug. 12, 2014

(54) EVAPORATED FUEL TREATING DEVICE

(75) Inventors: Masanori Sugiura, Aichi-ken (JP);
Hideki Teshima, Aichi-ken (JP);
Tsuneyuki Kurata, Aichi-ken (JP);
Naohito Buseki, Aichi-ken (JP)

(73) Assignee: Aisan Kogyo Kabushiki Kaisha,
Aichi-Ken (JP)

( * ) Notice: Subject to any disclaimer, the term of this patent is extended or adjusted under 35 U.S.C. 154(b) by 164 days.

(21) Appl. No.: 13/482,620

(22) Filed: May 29, 2012

(65) Prior Publication Data

US 2012/0304865 A1    Dec. 6, 2012

(30) Foreign Application Priority Data

May 31, 2011    (JP) .................................. 2011-122310

(51) Int. Cl.
*B01D 53/04*    (2006.01)
*F02M 25/08*    (2006.01)

(52) U.S. Cl.
CPC ........ *B01D 53/0407* (2013.01); *B01D 53/0446* (2013.01); *B01D 2259/4145* (2013.01); *B01D 2253/102* (2013.01); *B01D 2257/702* (2013.01); *B01D 2259/40086* (2013.01); *B01D 2259/403* (2013.01); *B01D 2259/41* (2013.01); *B01D 2259/4516* (2013.01); *F02M 25/0854* (2013.01)
USPC ............................................. 96/131; 96/152

(58) Field of Classification Search
CPC ... F02M 25/08; F02M 25/0854; B01D 53/04; B01D 53/0446; B01D 2253/102; B01D 2257/702; B01D 2259/402; B01D 2259/4145; B01D 2259/4516
USPC ................... 96/121, 131, 132, 139, 147, 152; 123/519
See application file for complete search history.

(56) References Cited

U.S. PATENT DOCUMENTS

| 5,538,542 | A | * | 7/1996 | Watanabe et al. ................ 96/131 |
| 5,645,036 | A | * | 7/1997 | Matsumoto et al. .......... 123/519 |
| 6,524,374 | B2 | * | 2/2003 | Moriyama et al. .............. 96/131 |
| 6,537,354 | B2 | * | 3/2003 | Meiller et al. ................... 96/139 |
| 6,942,721 | B2 | * | 9/2005 | Oh et al. ......................... 96/135 |
| 6,955,159 | B2 | * | 10/2005 | Ogawa .......................... 123/519 |
| 7,458,367 | B2 | * | 12/2008 | Kasuya .......................... 123/519 |
| 7,998,257 | B2 | * | 8/2011 | Makino et al. ................... 96/132 |
| 2005/0139068 | A1 | | 6/2005 | Kim |
| 2005/0172938 | A1 | | 8/2005 | Uchino |
| 2007/0119306 | A1 | * | 5/2007 | Yamada et al. ................. 96/131 |

FOREIGN PATENT DOCUMENTS

| JP | 2004-100691 | 4/2004 |
| JP | 2005-195007 | 7/2005 |
| JP | 2009-250059 | 10/2009 |

* cited by examiner

*Primary Examiner* — Frank Lawrence
(74) *Attorney, Agent, or Firm* — Dickinson Wright PLLC

(57) ABSTRACT

An evaporated fuel treating device lowers the blow-by volume of evaporated fuel emitted to the atmosphere via a casing having an atmospheric port. The casing has in series a first adsorbent chamber housing an adsorbent material, a space chamber not housing an adsorbent material and a second adsorbent chamber housing an adsorbent material. Each of the chambers is positioned beside an adjacent chamber thereof. The first chamber is disposed closest to the atmospheric port among the adsorbent chambers. An end part of the space chamber on a side of the first chamber has a first partition wall having an opening part with a plurality of first openings provided on a top side of the first partition wall. A current plate has one end positioned between the adjacent first openings and a surface and a rear face of the current plate are disposed along the top and bottom direction.

9 Claims, 16 Drawing Sheets

EVAPORATED FUEL TREATING DEVICE

BACKGROUND OF THE INVENTION (1) Field of the Invention

The present invention relates to an evaporated fuel treating device.

(2) Description of Related Art

Conventionally, an evaporated fuel treating device (hereinafter this may be called a canister) is used to temporarily adsorb a fuel component in evaporated fuel so as to prevent emission of the evaporated fuel from a fuel tank of a vehicle or the like to the atmosphere.

In recent years, a canister is required to reduce the diffusion amount of evaporated fuel to the atmosphere. As a canister with less diffusion amount of evaporated fuel to the atmosphere, a canister 101 as illustrated in FIG. 19 is known, including a casing 105 provided with a tank port 102, a purge port 103 and an atmospheric port 104. In the casing 105 are formed a first housing chamber 106 and a second housing chamber 107, the first housing chamber 106 communicating with the tank port 102 and the purge port 103, and the second housing chamber 107 communicating with the atmospheric port 104. The first housing chamber 106 and the second housing chamber 107 communicate with each other on the opposite side to the atmospheric port 104, and on the side of the atmospheric port 104 in the second housing chamber 107 is formed a first activated carbon chamber 108 filled with activated carbon. On the opposite side to the atmospheric port 104 side of the first activated carbon chamber 108 in the second housing chamber 107 is formed a space chamber 109 filled with no activated carbon, and on the opposite side to the atmospheric port 104 side of the space chamber 109 in the second housing chamber 107 is formed a second activated carbon chamber 110 filled with activated carbon, and in the first housing chamber 106 is formed a third activated carbon chamber 111 filled with activated carbon (for example, refer to JP-A-2005-195007).

In this canister 101, between the first activated carbon chamber 108 and the second activated carbon chamber 110 is provided the space chamber 109 so as to suppress diffusion of evaporated fuel to the first activated carbon chamber 108, thereby reducing the diffusion amount of evaporated fuel to the atmosphere.

In the aforementioned conventional canister 101, between the space chamber 109 and first activated carbon chamber 108 and between the space chamber 109 and the second activated carbon chamber 110 are provided a plate 113 and 114, and all over the plate 113 and 114 are formed communication holes 115. Therefore, this conventional canister fails to delay diffusion of evaporated fuel to the first activated carbon chamber 108 effectively.

BRIEF SUMMARY OF THE INVENTION

In view of the problem, it is an object of the present invention to provide an evaporated fuel treating device capable of coping with such a problem.

In order to cope with the aforementioned problem, an evaporated fuel treating device according to the present invention is characterized of including a casing provided with an atmospheric port, in which casing are provided in series along a flow of the evaporated fuel a first adsorbent chamber housing adsorbent material, a space chamber not housing adsorbent material and a second adsorbent chamber housing adsorbent material. The first adsorbent chamber, the space chamber and the second adsorbent chamber are disposed so that each chamber is positioned beside an adjacent chamber thereto. The first adsorbent chamber is disposed closest to the atmospheric port among adsorbent chambers housing adsorbent material. At an end part of the space chamber on a side of the first adsorbent chamber is provided a first partition wall, which is provided with an opening part including a plurality of first openings only, the first openings being provided on a top side of the first partition wall. A current plate is disposed so that one end of the current plate is positioned between the adjacent first openings and a surface and a rear face of the current plate are disposed along the top and the bottom direction.

In the present invention, at an end part of the space chamber on a side of the second adsorbent chamber may be provided a second partition wall, which second partition wall may be provided with an opening part including a plurality of second openings only, the second openings being provided on a top side of the second partition wall.

In the present invention, the first partition wall and the second partition wall may be coupled with a coupling part.

In the present invention, at least a part of the coupling part may include a current plate.

In the present invention, a space forming member including the first partition wall and the second partition wall and forming a space therein may be provided in the casing to form the space chamber, and the first partition wall and the second partition wall may be provided at opposed positions to each other.

In the present invention, a cross-sectional area of the first adsorbent chamber in a direction orthogonal to an axial direction of the casing may be smaller than a cross-sectional area of the second adsorbent chamber in a direction orthogonal to the axial direction of the casing along the entire axial direction of the first adsorbent chamber.

The present invention further may include a guide part to limit an orientation of the first partition wall and/or the second partition wall in the top and the bottom direction.

In the present invention, the first adsorbent chamber and the second adsorbent chamber house activated carbon, and the activated carbon housed in the first adsorbent chamber may adsorb less amount of evaporated fuel per unit volume than the activated carbon housed in the second adsorbent chamber.

In the present invention, a cross-sectional area of the first adsorbent chamber in a direction orthogonal to an axial direction of the casing may be reduced with closing to the atmospheric port.

In the present invention, an axis of the first adsorbent chamber may be positioned closer to the top than that of the second adsorbent chamber.

According to the present invention, with the space chamber provided between the second adsorbent chamber and the first adsorbent chamber, it can be delayed that a fuel component adsorbed to the second adsorbent chamber or the like is diffused to the first adsorbent chamber. Since the fuel components contain a lot of components heavier than the air, the opening part including the first openings only is provided in the first partition wall and the first openings are provided on the top side of the first partition wall, so as to allow the heavy fuel components to settle down in the space chamber, whereby the fuel components in the gas flowing into the first adsorbent chamber can be reduced. As a result, as compared with the aforementioned conventional canister, the fuel components in the first adsorbent chamber can be lowered, and the blow-by volume of the evaporated fuel that is emitted to the atmosphere through the atmospheric port can be lowered.

Further, the current plates are provided so that one end thereof is positioned between the adjacent first openings and a surface and rear-face thereof are disposed along the top and bottom direction. This configuration smooths the flow of purged air to be introduced to the casing through the atmospheric port, and therefore desorption efficiency of the fuel components adsorbed to the adsorbent material in the first adsorbent chamber can be improved. As a result, as compared with the aforementioned conventional canister, the remaining amount of the fuel components in the first adsorbent chamber can be lowered, whereby the blow-by volume of the evaporated fuel that is emitted to the atmosphere can be lowered.

BRIEF DESCRIPTION OF THE SEVERAL VIEWS OF DRAWING

DETAILED DESCRIPTION OF THE INVENTION

The following describes embodiments of the present invention, with reference to the drawings.

Embodiment 1

FIG. 1 to FIG. 8 illustrate Embodiment 1 according to the present invention.

Figure 1:
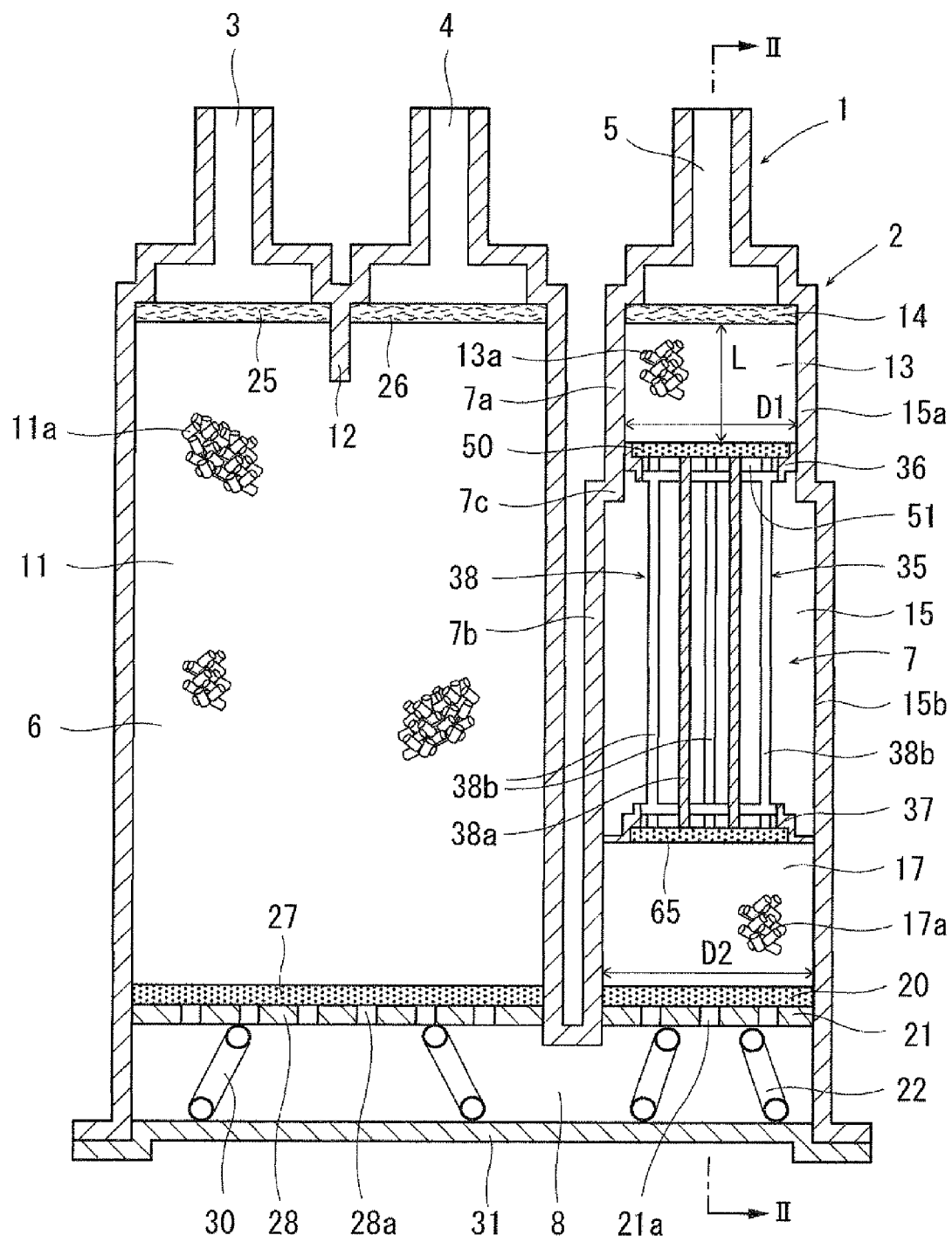
FIG. 1 is a schematic cross section of a configuration of an evaporated fuel treating device according to Embodiment 1 of the present invention in view of the above.
Figure 2:
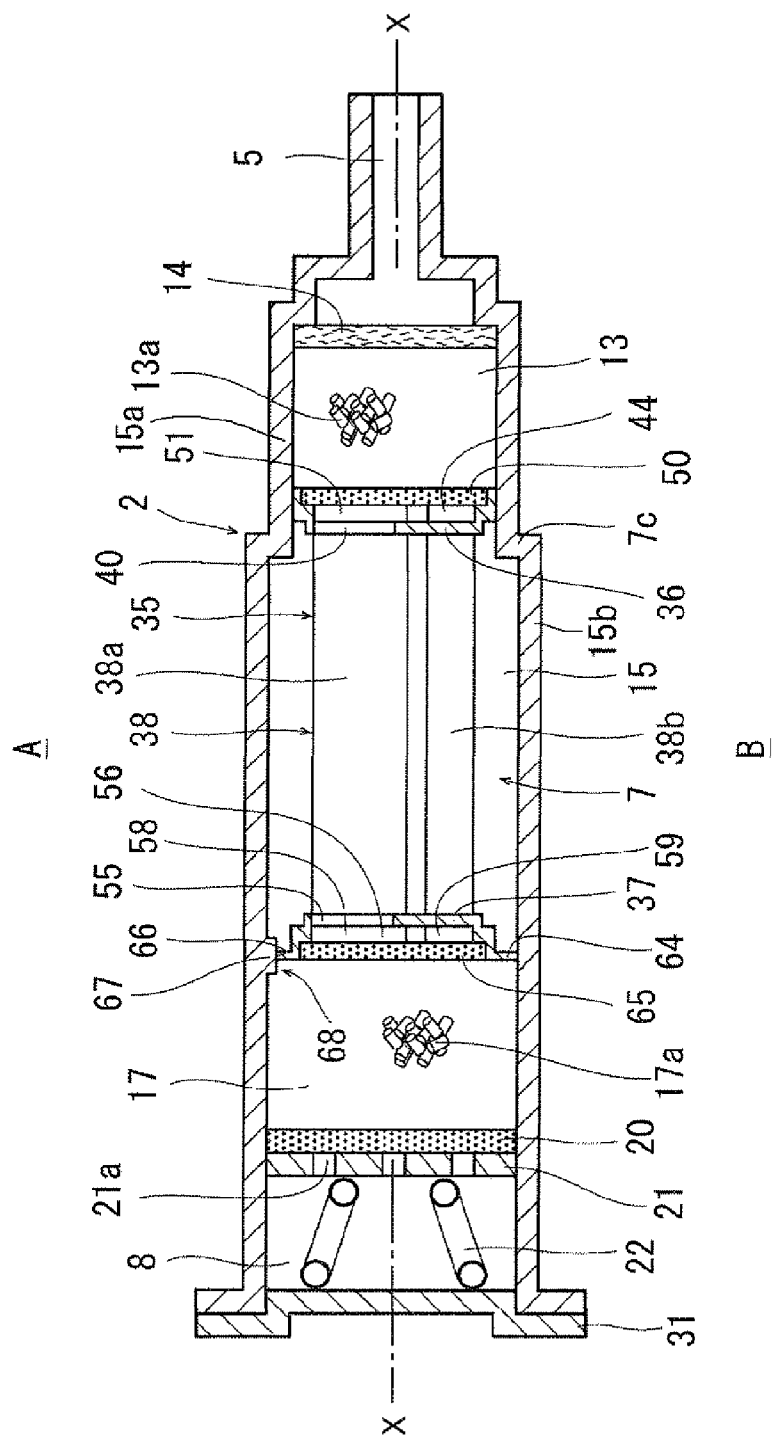
FIG. 2 is a schematic cross section of the configuration of the evaporated fuel treating device in FIG. 1 taken along the line II-II.

FIG. 1 schematically illustrates a cross section of a configuration of an evaporated fuel treating device 1 in view of the above, and as illustrated in FIGS. 1 and 2, this evaporated fuel treating device 1 is transversely disposed for use so that a tank port 3, a purge port 4 and an atmospheric port 5 protrude outwardly from one side part of a casing 2. In the following, the upside of FIG. 2 is referred to as a top side A and the downside of FIG. 2 is as a bottom side B for description.

As illustrated in FIGS. 1 and 2, on one side part of the casing 2 are provided the tank port 3, the purge port 4 and the atmospheric port 5, and in the casing 2 are formed a first housing chamber 6 and a second housing chamber 7, the first housing chamber 6 communicating with the tank port 3 and the purge port 4, and the second housing chamber 7 communicating with the atmospheric port 5. The first housing chamber 6 and the second housing chamber 7 communicate with each other via a space 8 formed in the casing 2 on the opposite side of the atmospheric port 5, and when gas flows from the tank port 3 to the atmospheric port 5, the gas returns back at the space 8 to flow in a substantially U-letter shape.

The tank port 3 communicates with an upper air chamber of a fuel tank via a valve not illustrated, and the purge port 4 is connected to an intake path of an engine via a purge control valve (VSV) and a purge path not illustrated. The degree of opening of this purge control valve is controlled by an electronic control unit (ECU) so that purge control is performed during engine operation.

Between the tank port 3 and the purge port 4 in the casing 2 is provided a baffle plate 12 to extend from an inner face of the casing 2 and to reach a part of a third adsorbent chamber 11 described later. The baffle plate 12 makes fluid flowing between the tank port 3 and the purge port 4 circulate via the third adsorbent chamber 11 described later.

As illustrated in FIGS. 1 and 2, the second housing chamber 7 includes a first cylinder 7a formed on the atmospheric port 5 side, a second cylinder 7b formed on the space 8 side and a stepped part 7c in a flanged shape coupling the first cylinder 7a with the second cylinder 7b. The first cylinder 7a is a cylinder having a substantially constant inner diameter D1 overall in a direction of a center axis X-X in FIG. 2, and the second cylinder 7b is a cylinder having a substantially constant inner diameter D2 overall in the direction of the center axis X-X, where the inner diameter D2 is larger than the inner diameter D1. The lengths of the first cylinder 7a and the second cylinder 7b in the direction of the center axis X-X may be desirably set in accordance with the lengths of a first adsorbent chamber 13, a space chamber 15 and a second adsorbent chamber 17 described later in the direction of the center axis X-X.

As illustrated in FIGS. 1 and 2, in the first cylinder 7*a* of the second housing chamber 7 on the atmospheric port 5 side is formed the first adsorbent chamber 13 filled with activated carbon 13*a* as an adsorbent material with a predetermined density, and the activated carbon 13*a* in the first adsorbent chamber 13 is made up of granulated carbon of a predetermined average particle diameter. The activated carbon 13*a* may be pulverized coal. In the present embodiment, as the activated carbon 13*a* in the first adsorbent chamber 13 is used activated carbon of which butane working capacity (BWC) is about 11 g/dL with in accordance with ASTM D5228. An end face of the first adsorbent chamber 13 on the atmospheric port 5 side is covered with a filter 14 made of nonwoven fabric or the like.

As illustrated in FIGS. 1 and 2, beside the first adsorbent chamber 13 in the second housing chamber 7 on the space 8 side is formed the space chamber 15 not housing adsorbent material therein. As illustrated in FIGS. 1 and 2, this space chamber 15 is formed across the first cylinder 7*a* of the inner diameter D1 and the second cylinder 7*b* of the second diameter D2 so that the stepped part 7*c* is formed to be in the space chamber 15. That is, the space chamber 15 has a small diameter part 15*a* of the inner diameter D1 and a large diameter part 15*b* of the inner diameter D2.

As illustrated in FIGS. 1 and 2, beside the space chamber 15 on the space 8 side is formed the second adsorbent chamber 17 filled with activated carbon 17*a* as adsorbent material with a predetermined density, and the activated carbon 17*a* in the second adsorbent chamber 17 is made up of granulated carbon of a predetermined average particle diameter. The activated carbon 17*a* may be pulverized carbon. Preferably, the activated carbon 17*a* used in the second adsorbent chamber 17 adsorbs more amount of evaporated fuel per unit volume than the activated carbon 13*a* in the first adsorbent chamber 13. In the present embodiment, as the activated carbon 17*a* in the second adsorbent chamber 17 is used activated carbon with butane working capacity (BWC) of about 15 g/dL in accordance with ASTM D5228.

At an end face of the second adsorbent chamber 17 on the space 8 side is provided a filter 20 made of urethane or the like so as to cover the entire face. On the space 8 side of the filter 20 is provided a plate 21 including a large number of communication holes 21*a* provided substantially uniformly all over the face. The plate 21 is biased to the atmospheric port 5 side by a bias member 22 such as a spring.

In the first housing chamber 6 is provided the third adsorbent chamber 11 filled with activated carbon 11*a* as adsorbent material with a predetermined density, and the activated carbon 11*a* in the third adsorbent chamber 11 is made up of granulated carbon of a predetermined average particle diameter. The activated carbon 11*a* may be pulverized carbon. In the present embodiment, as the activated carbon 11*a* in the third adsorbent chamber 11 is used the same activated carbon as the activated carbon 17*a* of the second adsorbent chamber 17 with butane working capacity (BWC) of about 15 g/dL in accordance with ASTM D5228.

An end face of the third adsorbent chamber 11 on the tank port 3 side is covered with a filter 25 made of nonwoven fabric or the like on the tank port 3 side and is entirely covered with a filter 26 made of nonwoven fabric or the like on the purge port 4 side. On the space 8 side of the third adsorbent chamber 11 is provided a filter 27 made of urethane or the like so as to cover the entire end face, and on the space 8 side of the filter 27 is provided a plate 28 including a large number of communication holes 28*a* provided substantially uniformly all over the face. The plate 28 is biased to the side of the tank port 3 and the purge port 4 by a bias member 30 such as a spring.

Between the plates 21, 28 and a lid 31 of the casing 2 is formed the space 8, and via the space 8 the third adsorbent chamber 11 communicates with the second adsorbent chamber 17.

Next, the following describes the space chamber 15 in detail.

As illustrated in FIGS. 1 and 2, between the first adsorbent chamber 13 and the second adsorbent chamber 17 in the casing 2 is provided a space forming member 35 to define the space chamber 15. As illustrated in FIGS. 3 to 8, the space forming member 35 includes a first partition wall 36 provided at an end part thereof on the first adsorbent chamber 13 side and a second partition wall 37 provided at an end part of the space forming member 35 on the second adsorbent chamber 17 side, and these first partition wall 36 and second partition wall 37 are integrally coupled with a coupling part 38. The first partition wall 36 and the second partition wall 37 are provided so as to be opposed to and substantially in parallel with each other.

Figure 3:
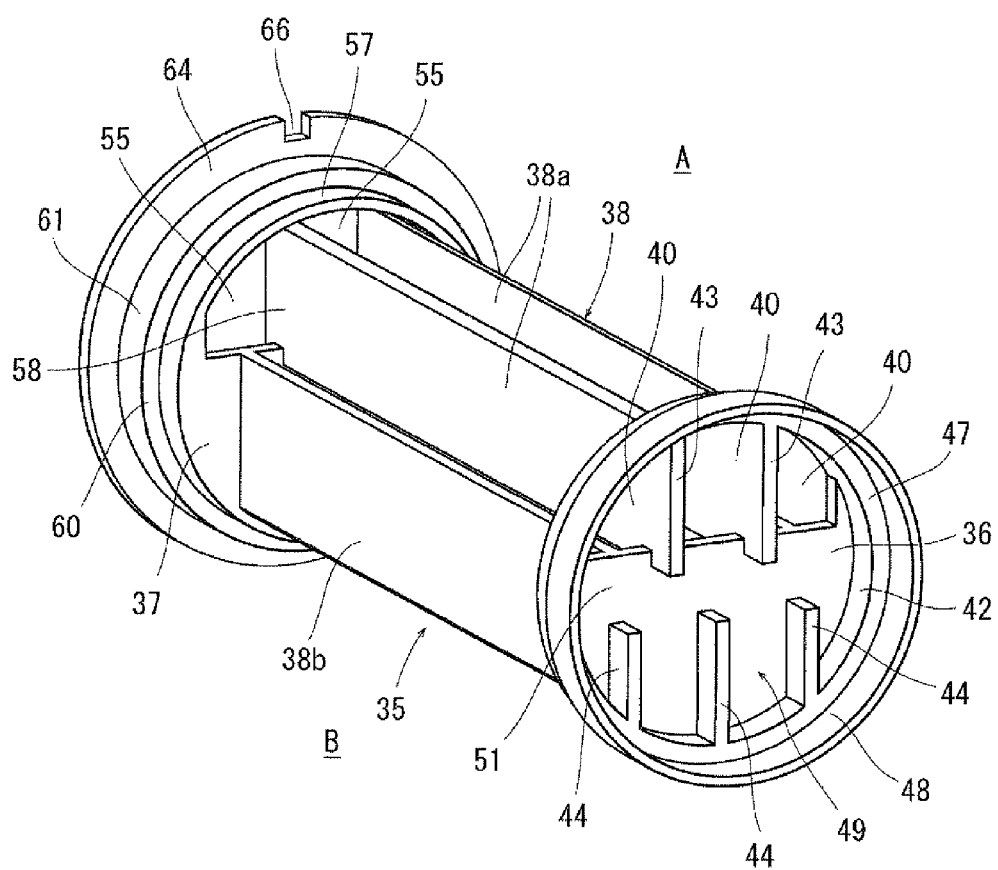
FIG. 3 is a perspective view of a space forming member used in Embodiment 1 of the present invention.

As illustrated in FIGS. 1 and 2, the first partition wall 36 has an outer shape that is the same as the shape of an inner face of the small diameter part 15*a* of the space chamber 15 but is a little bit smaller than the small diameter part 15*a*. As illustrated in FIG. 3, in the present embodiment, the first partition wall 36 is formed in a circle shape.

The first partition wall 36 is provided with a plurality of first openings 40 to penetrate through the first partition wall 36 in the surface and rear-face direction, and the first openings 40 are provided on the top side A of the first partition wall 36. The first partition wall 36 does not have openings penetrating therethrough in the surface and rear-face direction other than the first openings 40. The plurality of first openings 40 may be formed on the top side A of the first partition wall 36, i.e., on the top side A in the top and bottom direction (A-B direction of the drawing) of the first partition wall 36 in an eccentric manner. The first openings 40 of any shape and size may be provided in any number, but the first openings 40 preferably have an end face on the bottom side B that is positioned on the top side A with reference to the center in the top and bottom direction (A-B direction of the drawing) of the first partition wall 36. As illustrated in FIG. 3, in the present embodiment, three of the first openings 40 are disposed at appropriate intervals in the transverse direction, and these three first openings 40 are in the shape of a substantially upper semicircle divided into substantially three equal parts in the transverse direction. Preferably, in the present embodiment, the total opening area of the three first openings 40 is set to be substantially the same as a cross-sectional area of a channel of the atmospheric port 5 at an end part on the first adsorbent chamber 13 side.

Figure 6:
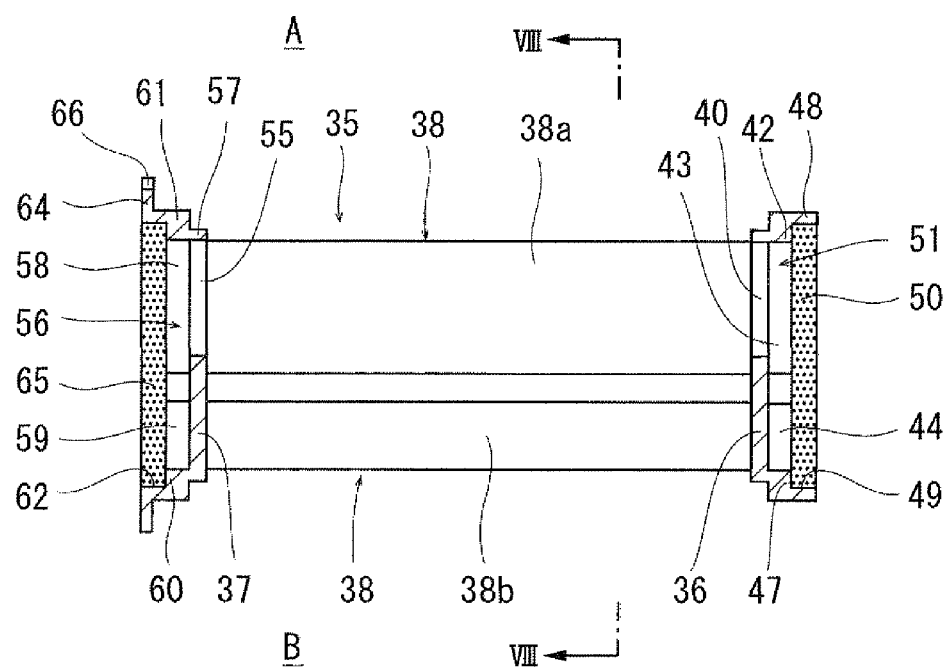
FIG. 6 is a cross-sectional view taken along the line VI-VI in FIG. 4 in the state where a filter is attached to the space forming member in FIG. 3.
Figure 7:
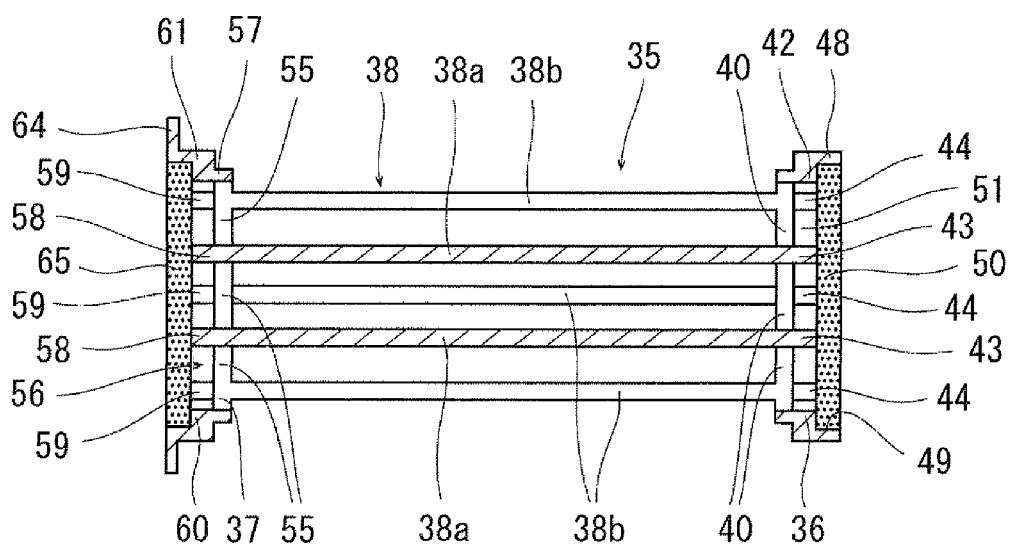
FIG. 7 is a cross-sectional view taken along the line VII-VII in FIG. 4 in the state where the filter is attached to the space forming member in FIG. 3.

At an outer periphery part of the first partition wall 36 is formed a cylindrical part 42 in a cylindrical shape so as to protrude to the atmospheric port 5 side, and the cylindrical part 42 has an outer shape that is the same as the outer shape of the first partition wall 36. As illustrated in FIGS. 1 to 4, 6 and 7, between adjacent first openings 40 and 40 are formed top-side clearance defining members 43 so as to protrude from the first partition wall 36 toward the atmospheric port 5 and to have a longitudinal direction along the top and bottom direction (A-B direction). As illustrated in FIGS. 3, 4, 6 and 7, on the bottom side of the first partition wall 36 are formed three bottom-side clearance defining members 44 at appropriate intervals so as to protrude from the first partition wall 36 in the direction toward the atmospheric port 5 and have a longitudinal direction along the top and bottom direction (A-B direction). As illustrated in FIG. 3, the top-side clearance defining members 43 and the bottom-side clearance defining members 44 are not coupled mutually, and a clearance 51 is formed therebetween. As illustrated in FIGS. 6 and 7, the cylindrical part 42, the top-side clearance defining members 43 and the bottom-side clearance defining members 44 have their end faces on the atmospheric port 5 side that are positioned on a substantially same plane.

At an end face of the cylindrical part 42 on the atmospheric port 5 side is formed a diameter expansion part 47 where a diameter is expanded outwardly in the radial direction, and at an outer periphery part of the diameter expansion part 47 is formed a cylindrical part 48 in a cylindrical shape so as to protrude to the atmospheric port 5 side. The cylindrical part 48 has an outer peripheral face in the shape abutting on the inner face of the small diameter part 15a of the space chamber 15. The diameter expansion part 47 and the cylindrical part 48 make up a filter housing part 49.

In the filter housing part 49 is detachably housed a filter 50 made of urethane or the like, and one of the faces of the filter 50 is provided abutting on end faces of the cylindrical part 42, the diameter expansion part 47, the top-side clearance defining members 43 and the bottom-side clearance defining members 44 on the atmospheric port 5 side. The cylindrical part 42, the diameter expansion part 47, the top-side clearance defining members 43 and the bottom-side clearance defining members 44 separate the filter 50 from the first partition wall 36, and so between the filter 50 and the first partition wall 36 is defined the clearance 51 communicating with the first openings 40. The filter housing part 49 and the filter 50 have end faces on the atmospheric port 5 side that are positioned in a substantially same plane.

Figure 5:
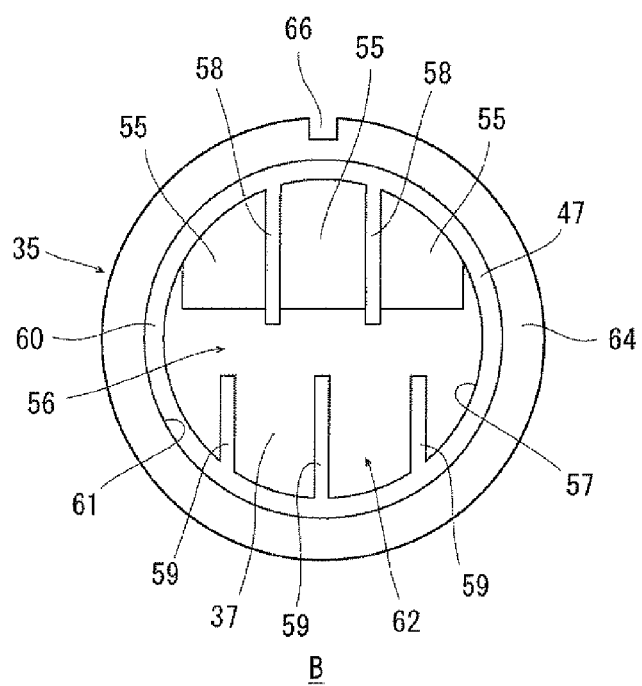
FIG. 5 is an end view of the space forming member in FIG. 3 in view of the second adsorbent chamber side.

As illustrated in FIG. 5, the second partition wall 37 has the same size and shape as those of the first partition wall 36.

Figure 4:
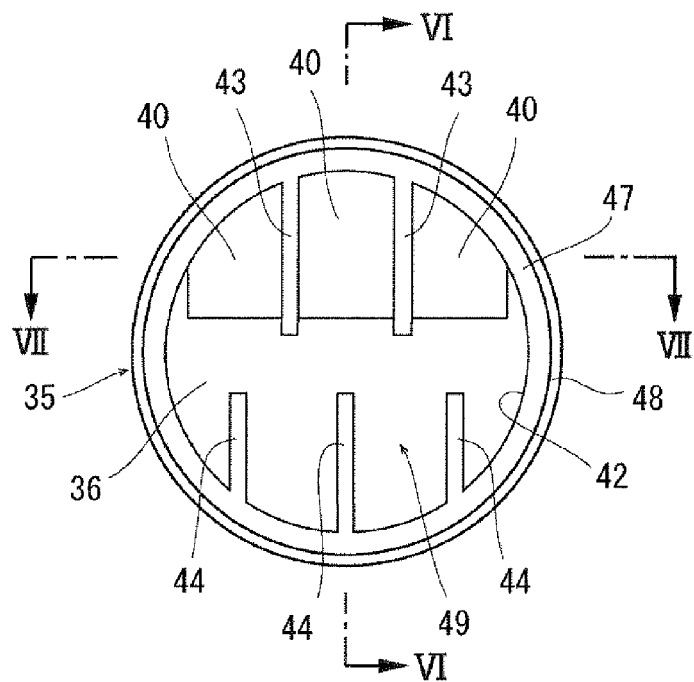
FIG. 4 is an end view of the space forming member in FIG. 3 in view of the first adsorbent chamber side.

The second partition wall 37 is provided with a plurality of second openings 55 to penetrate through the second partition wall 37 in the surface and rear-face direction, and the second openings 55 are provided on the top side A of the second partition wall 37. The second partition wall 37 does not have openings penetrating therethrough in the surface and rear-face direction other than the second openings 55. The plurality of second openings 55 only have to be formed on the top side A of the second partition wall 37, i.e., on the top side A of the top and bottom direction (A-B direction) of the second partition wall 37 in an eccentric manner. The second openings 55 of any shape and size may be provided in any number, but the second openings 55 preferably have an end face on the bottom side B that is positioned on the top side A with reference to the center of the top and bottom direction (A-B direction) of the second partition wall 37. As illustrated in FIG. 4, in the present embodiment, the second openings 55 have the same shape and size as those of the corresponding first openings 40 of the first partition wall 36. Preferably, the total opening area of the second openings 55, which are three second openings 55 in the present embodiment is set to be substantially the same as a cross-sectional area of a channel of the atmospheric port 5 at an end part on the first adsorbent chamber 13 side.

At an outer periphery part of the second partition wall 37 is formed a cylindrical part 57 in a cylindrical shape so as to protrude to the space 8 side, and the cylindrical part 57 has an outer shape that is the same as the outer shape of the second partition wall 37. The cylindrical part 57 has the same of the cylindrical part 42 of the first partition wall 36.

As illustrated in FIGS. 1, 2 and 5 to 8, between adjacent second openings 55 and 55 are formed plate-like top-side clearance defining members 58 so as to protrude from the second partition wall 37 in the direction toward the space 8 and have a longitudinal direction along the top and bottom direction (A-B direction). As illustrated in FIG. 5, on the bottom side B of the second partition wall 37 are formed three bottom-side clearance defining members 59 at appropriate intervals so as to protrude in the direction toward the space 8 and have a longitudinal direction along the top and bottom direction (A-B direction). As illustrated in FIG. 5, the top-side clearance defining members 58 and the bottom-side clearance defining members 59 are not coupled mutually, and a clearance 56 is formed therebetween. As illustrated in FIGS. 6 and 7, the cylindrical part 57, the top-side clearance defining members 58 and the bottom-side clearance defining members 59 have their end faces on the space 8 side that are positioned in a substantially same plane.

At an end face of the cylindrical part 57 on the space 8 side is formed a diameter expansion part 60 in a flanged shape where a diameter is expanded outwardly in the radial direction, and at an outer periphery part of the diameter expansion part 60 is formed a cylindrical part 61 in a cylindrical shape so as to protrude to the space 8 side. The diameter expansion part 60 and the cylindrical part 61 make up a filter housing part 62. The filter housing part 62 is formed in a similar manner to the filter housing part 49 provided on the first partition wall 36 side. At an end face of this filter housing part 62 on the space 8 side is formed a flange part 64 where a diameter is expanded outwardly in the radial direction. The flange part 64 has an outer peripheral face abutting on the inner face of the large diameter part 15b of the space chamber 15.

In the filter housing part 62 is detachably housed a filter 65 made of urethane or the like, and a face of the filter 65 on the atmospheric port 5 side abuts on end faces of the cylindrical part 57, the diameter expansion part 60, the top-side clearance defining members 58 and the bottom-side clearance defining members 59 on the space 8 side. The cylindrical part 57, the top-side clearance defining members 58 and the bottom-side clearance defining members 59 separate the filter 65 from the second partition wall 37, and so between the filter 65 and the second partition wall 37 is defined the clearance 56 communicating with the second openings 55. The flange part 64 and the filter 65 have end faces on the space 8 side that are positioned in a substantially same plane. The filter 65 may have the same size of the filter 50 provided on the first partition wall 36 side, whereby the same type components can be used for both of the filters 50 and 65 so as to enable reduction of the types of components for cost reduction.

At an end part of the flange part 64 on the top side A is formed a notch 66. As illustrated in FIG. 2, at a position in the space chamber 15 corresponding to the notch 66 is formed a protrusion 67 so as to protrude inwardly from the inner face and engage with the notch 66. These notch 66 and protrusion 67 make up a guide part 68 to limit an orientation of the second partition wall 37 in the top and bottom direction (A-B direction).

As illustrated in FIGS. 1 to 3, 6 and 7, the coupling part 38 includes top-side coupling members 38a as two plate-like current plates and three plate-like bottom-side coupling members 38b.

Figure 8:
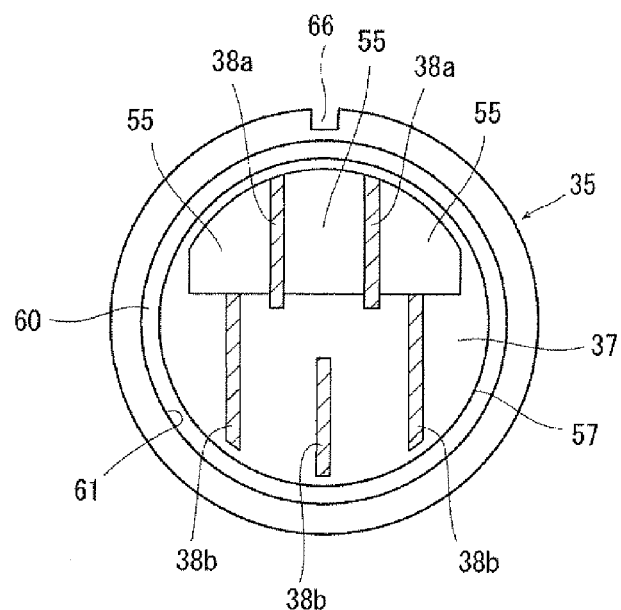
FIG. 8 is a cross-sectional view taken along the line VIII-VIII in FIG. 6.

As illustrated in FIGS. 3, 7 and 8, each top-side coupling member 38a has one end positioned between the adjacent first openings 40 and 40 in the first partition wall 36 and the other end positioned between the adjacent second openings 55 and 55 in the opposed second partition wall 37, and is provided so that its surface and rear face are directed along the top and bottom direction (A-B direction). Each top-side coupling members 38a is formed orthogonal to both of the partition walls 36 and 37. An end of the top-side coupling members 38a on the top side A is positioned at ends of the partition walls 36 and 37 on the top side A, and an end of the top-side coupling members 38a on the bottom side B is positioned closer to the bottom side B than the end faces of the openings 40 and 55 on the bottom side B.

As illustrated in FIGS. 3 and 8, each bottom-side coupling members 38b is disposed between the first partition wall 36 on the bottom side B and the second partition wall 37 on the bottom side B, and is provided so that its surface and rear face are directed along the top and bottom direction (A-B direction). Each bottom-side coupling members 38b is formed orthogonal to both of the partition walls 36 and 37.

As illustrated in FIG. 8, the bottom-side coupling members 38b, 38b on both sides have ends on the top side A positioned at end faces of the openings 40 and 55 on the bottom side B, and the center bottom-side coupling member 38b has an end on the top side A positioned below the end faces of the openings 40 and 55 on the bottom side B. Each bottom-side coupling members 38b has an end on the bottom side B that is positioned at ends of the first partition wall 36 and the second partition wall 37 on the bottom side B.

The first partition wall 36, the second partition wall 37, the coupling part 38, the cylindrical parts 42, 57 and 61, the top-side clearance defining members 43 and 58, the bottom-side clearance defining members 44 and 59, the filter housing parts 49 and 62 and the flange part 64 are integrally formed using a resin or the like, thus forming the space forming member 35.

With this configuration, gas containing evaporated fuel flowing from the tank port 3 into the evaporated fuel treating device 1 flows into the third adsorbent chamber 11, the space 8 and the second adsorbent chamber 17, then passes through the filter 65 and the clearance 56 and flows into the space chamber 15 from the top side A through the second openings 55 provided on the top side A.

Then, the gas is diffused in the top and bottom direction (A-B direction) in the space chamber 15, while a heavy component in the fuel components settles down to generate concentration gradient in the top and bottom direction (A-B direction). Such gas on the top side A passes through the first openings 40 provided on the top side A and is diffused all over the clearance 51, then passes through substantially the entire filter 50 and flows into the first adsorbent chamber 13, and thereafter is emitted to the atmosphere through the atmospheric port 5. During this time, the fuel component is adsorbed to the activated carbon 11a, 13a and 17a.

Meanwhile, when purge control is performed during engine operation, the purge control valve is opened by the electronic control unit (ECU), and air sucked into the evaporated fuel treating device 1 through the atmospheric port 5 due to negative pressure in the intake path flows in the opposite direction to that of the above to be fed to the intake path of the engine through the purge port 4. At this time, the fuel component adsorbed to the activated carbon 11a, 13a and 17a is desorbed therefrom to be fed to the engine together with the air.

When the engine of the vehicle is stopped for parking or the like, a fuel component desorbed from the activated carbon 11a and 17a in the second adsorbent chamber 17 and the third adsorbent chamber 11, as well as the air, flows into the space chamber 15 from the second openings 55, and a heavy component in the fuel components settles down in the space chamber 15. The gas positioned above (on the top side) flows into the first adsorbent chamber 13 through the first openings 40 provided on the top side A of the first partition wall 36, and a fuel component in the gas is adsorbed to the adsorbent material 13a, and thereafter the gas is emitted to the atmosphere through the atmospheric port 5.

Since the evaporated fuel treating device 1 according to the present invention has the aforementioned configuration and structure, the following actions and advantageous effects can be obtained therefrom.

Since the space chamber 15 is provided between the first adsorbent chamber 13 and the second adsorbent chamber 17, diffusion of the fuel component adsorbed to the activated carbon in the second adsorbent chamber 17 and the third adsorbent chamber 11 to the first adsorbent chamber 13 can be delayed, and the fuel component flowing into the first adsorbent chamber 13 can be lowered, whereby the blow-by volume of evaporated fuel that is emitted to the atmosphere through the atmospheric port 5 can be lowered.

Further, the fuel components contains a lot of component heavier than the air, and therefore concentration gradient occurs in the second adsorbent chamber 17 so that the ratio of the fuel components included in the gas flowing out to the space chamber 15 through the second openings 55 provided on the top side of the second partition wall 37 becomes less than the ratio of the fuel components in the gas in the second adsorbent chamber 17. Concentration gradient occurs in the space chamber 15 as well, and therefore the ratio of the evaporated fuel flowing out to the first adsorbent chamber 13 through the first openings 40 provided on the top side of the first partition wall 36 can be further lowered than the ratio during the flowing-in to the space chamber 15. Thereby, the amount of evaporated fuel flowing into the first adsorbent chamber 13 can be lowered, and the blow-by volume of evaporated fuel that is emitted to the atmosphere through the atmospheric port 5 can be lowered.

Further, since the inner diameter D1 orthogonal to the center axis X-X of the first adsorbent chamber 13 is made smaller than the inner diameter D2 orthogonal to the center axis X-X of the second adsorbent chamber 17, the ratio L/D1 of the length L of first adsorbent chamber 13 in the center axis X-X direction to the inner diameter D1 orthogonal to the center axis X-X of the first adsorbent chamber 13 can be made larger than that of the case where the inner diameter D1 orthogonal to the center axis X-X of the first adsorbent chamber 13 is the same as the inner diameter D2 orthogonal to the center axis X-X of the second adsorbent chamber 17, whereby the blow-by volume of evaporated fuel to the atmosphere can be made smaller.

When the activated carbon 13a in the first adsorbent chamber 13 is used having an evaporated fuel adsorbent amount per unit volume smaller than that of the activated carbon 11a and 17a in the third adsorbent chamber 11 and the second adsorbent chamber 17, the adsorbent amount of evaporated fuel adsorbed in the first adsorbent chamber 13 can be reduced as compared with the case where activated carbon used for these chambers has the same adsorbent amount per unit volume, whereby the blow-by volume of evaporated fuel to the atmosphere can be made smaller.

The top-side coupling members 38a served as current plates are formed in the shape of a plate, one end thereof is positioned between adjacent first openings 40 and 40 in the first partition wall 36 and the other end is positioned between the corresponding adjacent second openings 55 and 55 in the second partition wall 37, and their surface and rear-faces are disposed along the top and bottom direction (A-B direction). With this configuration, the top-side coupling members 38a can exert a current control effect of the gas flowing in the space chamber 15.

The top-side coupling members 38a serving as current plates smooth the flow of purged air to be introduced to the casing 2 through the atmospheric port 5, and therefore desorption efficiency by the purged air of the fuel component adsorbed to the activated carbon 13a in the first adsorbent chamber 13 can be improved. As a result, as compared with the aforementioned conventional canister, the remaining amount of the fuel component in the first adsorbent chamber 13 can be lowered, whereby the blow-by volume of evaporated fuel that is emitted to the atmosphere can be lowered.

The guide part 68 provided to limit an orientation in the top and bottom direction (A-B direction) allows the openings 40 and 55 of the space forming member 35 to be positioned on the top side A with reliability for attachment in the casing 2.

In this embodiment, as illustrated in FIGS. 1 and 2, the tank port 3, the purge port 4 and the atmospheric port 5 protrude outwardly from one side part of the casing 2. Instead, the tank port 3, the purge port 4 and the atmospheric port 5 may protrude upwardly or downwardly from side end parts of the casing.

The shape of the guide part 68 is not limited to the aforementioned configuration, and may have any configuration as long as the space forming member 35 can be attached in the casing 2 so that their openings 40 and 55 are positioned on the top side A.

The inner wall of the second housing chamber 7 is configured by coupling the first cylinder 7a and the second cylinder 7b with the stepped part 7c. Instead, the first cylinder 7a and the second cylinder 7b may be coupled with a tapered part in the shape of a frustum of cone. In this case, the first adsorbent chamber 13 may be formed in the first cylinder 7a and the second cylinder 7b may be formed across the space chamber 15 and the tapered part.

Embodiment 2

Figure 9:
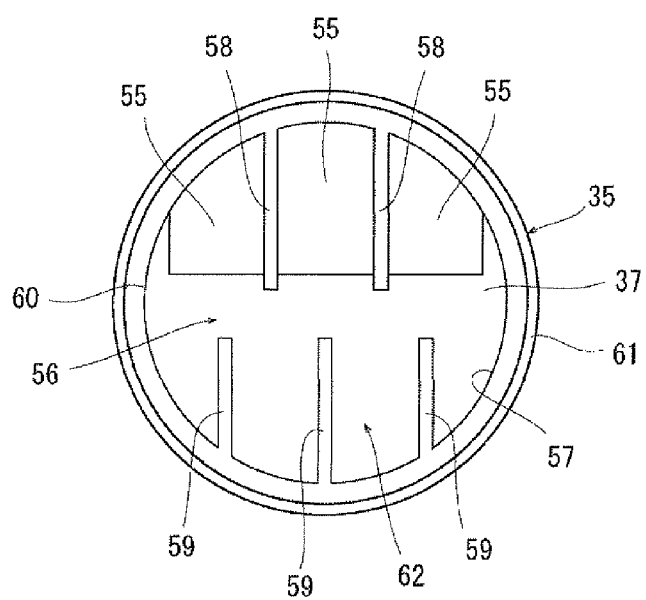
FIG. 9 is a cross-sectional view of a space forming member used in Embodiment 2 of the present invention, corresponding to FIG. 5 of Embodiment 1.

In Embodiment 1, the filter housing part 49 on the first partition wall 36 side and the filter housing part 62 on the second partition wall 37 side have the same shape, and the filters 50 and 65 have the same size and shape so that one type of components can be used for both of the filters 50 and 65. Instead, as illustrated in FIG. 9, the flange part 64 of Embodiment 1 is not provided, and the second partition wall 37 may have the outer shape abutting on the inner face of the large diameter part 15b of the space chamber 15 and have a size larger than that of the first partition wall 36, and the cylindrical part 57, the filter housing part 62 and the filter 65 on the second partition wall 37 side may be made larger than the cylindrical part 42, the filter housing part 49 and the filter 50 on the first partition wall 36 side, and different types of components may be used for the filters 50 and 65.

Since the configuration in other points is similar to that in Embodiment 1, the description thereon is omitted. Embodiment 2 also has similar advantageous effects to those of Embodiment 1.

Embodiment 3

In Embodiments 1 and 2, the coupling part 38 includes five plate-like members, which are provided in the shapes and at the positions as illustrate in FIGS. 5 to 8. Instead of the plate-like members, a coupling member of any shape such as a cylindrical column or a polygonal prism such as a quadrangular prism or a hexagonal column may be provided as the coupling part 38, the coupling member may be provided at any position or the coupling members in any number may be set to make up the coupling part 38 as long as a constant distance between the first partition wall 36 and the second partition wall 37 can be kept.

Although the top-side coupling members 38a as a part of the coupling part 38 is used as current plates, a current plate may be provided as a member different from the coupling part 38. As long as such the current plate may have one end positioned between adjacent first openings 40 and 40, and a surface and a rear face thereof may be positioned along the top and bottom direction, the current plate may have any shape. The other end of the current plate does not have to be positioned between adjacent second openings 55 and 55, and for example, the other end may not be coupled with any member.

Since the configuration in other points is similar to that in Embodiments 1 and 2, the description thereon is omitted. These modified embodiments also have similar advantageous effects to those of Embodiments 1 and 2.

Although the coupling member preferably is positioned or has a shape so as to exert a current control effect in the space chamber 15, the coupling member may be positioned or have a shape not to exert a current control effect.

Embodiment 4

Figure 10:
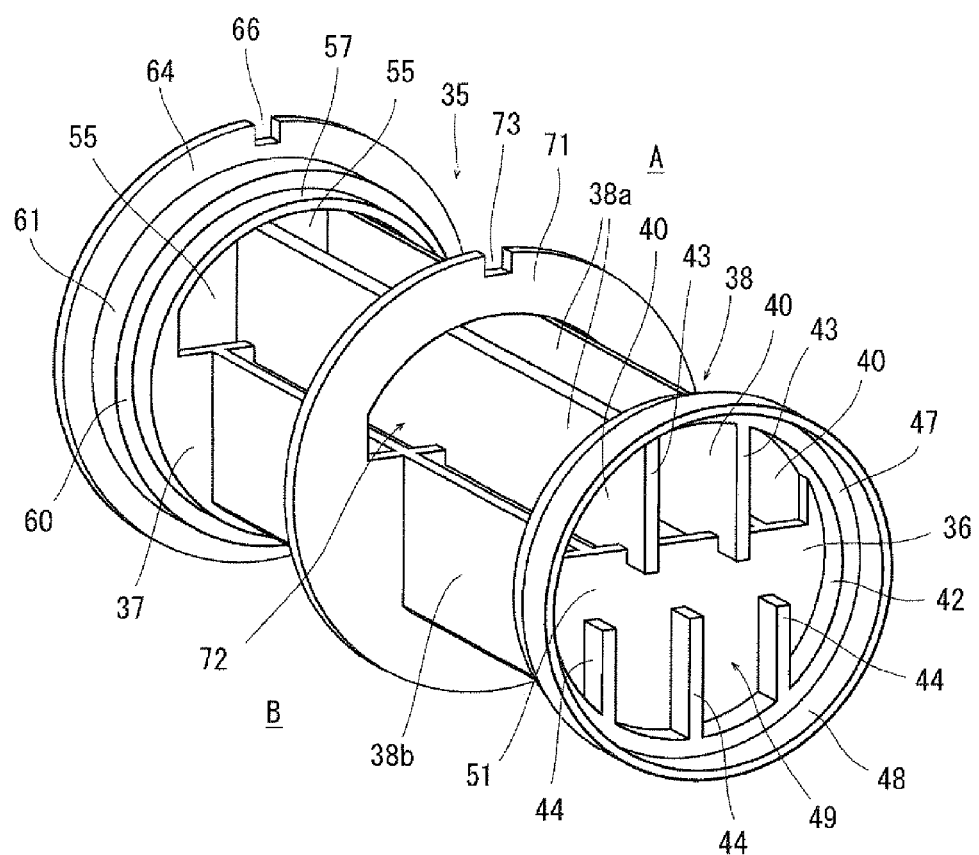
FIG. 10 is a perspective view of a space forming member used in Embodiment 4 of the present invention.
Figure 11:
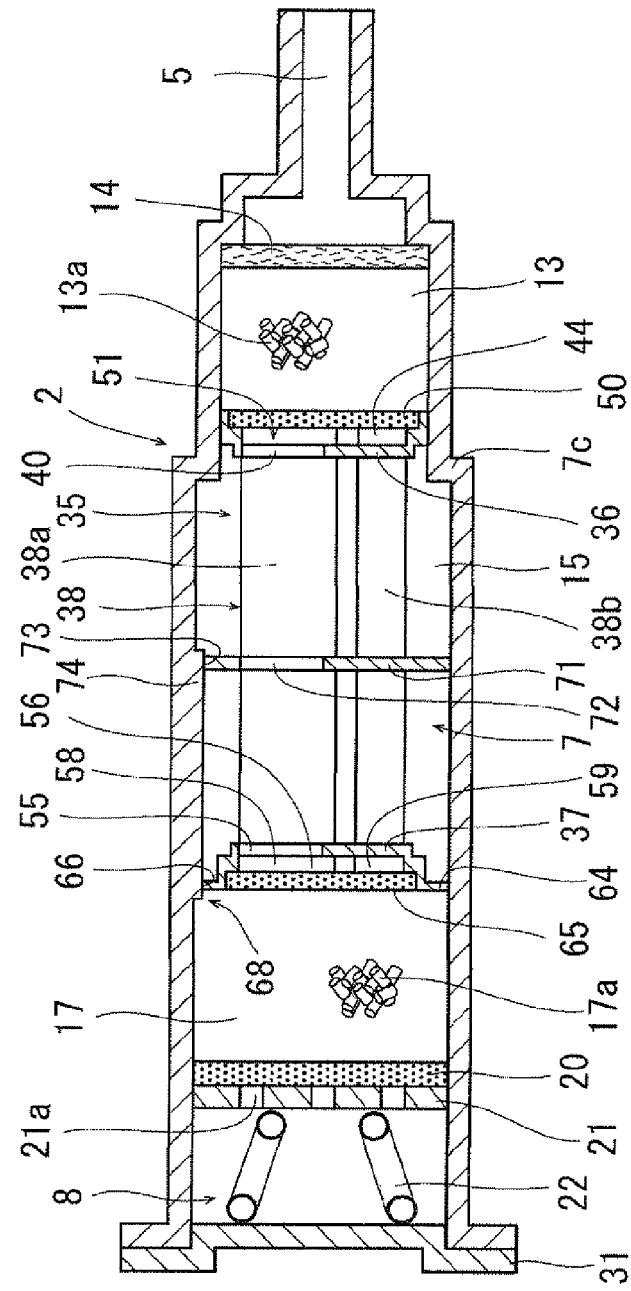
FIG. 11 is a schematic cross section of a configuration of an evaporated fuel treating device according to Embodiment 4 of the present invention, corresponding to FIG. 2 of Embodiment 1.

As illustrated in FIGS. 10 and 11, for example, in Embodiment 4, between the first partition wall 36 and the second partition wall 37 in Embodiments 1 to 3 is additionally provided a partition wall 71. The number of the partition wall 71 provided between the first partition wall 36 and the second partition wall 37 is not limited to one as illustrated in FIG. 10, and any number may be set as long as a space can be formed allowing evaporated fuel heavier than the air to settle down between adjacent partition walls.

As illustrated in FIG. 11, the partition wall 71 is disposed substantially in parallel with the first partition wall 36 and the second partition wall 37, and has an outer peripheral face abutting on the inner face of the large diameter part 15b of the space chamber 15. On the top side A of the partition wall 71 are formed three openings 72 having the same configuration as that of the first and second openings 40 and 55 in the first and second partition walls 36 and 37 in Embodiment 1. The plurality of openings 72 may be formed on the top side with reference to the center of the top and bottom direction of the partition wall 71 in an eccentric manner, and any shape, size and number of the openings may be set. They may have the same configuration as that of the first openings 40, may be different in shape, size or number, or may have a different configuration. However, preferably, the total opening area of the three first openings 71 is set to be substantially the same as a flow path area of a channel of the atmospheric port 5 at an end part on the first adsorbent chamber 13 side.

The top-side coupling members 38a and the bottom-side coupling members 38b may be formed with reference to the partition wall 71 at positions similar to those of the first and second partition walls 36 and 37 in Embodiment 1.

At an end part of the partition wall 71 on the top side A is formed a notch 73. As illustrated in FIG. 11, at a position of the space chamber 15 corresponding to the notch 73 is formed a protrusion 74 so as to protrude inwardly and engage with the notch 73.

Since the configuration in other points is similar to that in Embodiments 1 to 3, the description thereon is omitted. Embodiment 4 also has similar advantageous effects to those of Embodiments 1 to 3.

In Embodiment 4, the partition wall 71 is additionally provided, whereby the movement (diffusion) of fuel components in the space chamber 15 to the first adsorbent chamber 13 can be further delayed than in Embodiments 1 to 3, whereby the amount of the fuel components flowing into the first adsorbent chamber 13 can be lowered and the blow-by volume of evaporated fuel that is emitted to the atmosphere through the atmospheric port 5 can be more lowered than in Embodiments 1 to 3.

Embodiment 5

In Embodiment 5, a space chamber 15 is formed using a space forming member 81 different from the space forming member 35 in Embodiments 1 to 4.

Figure 12:
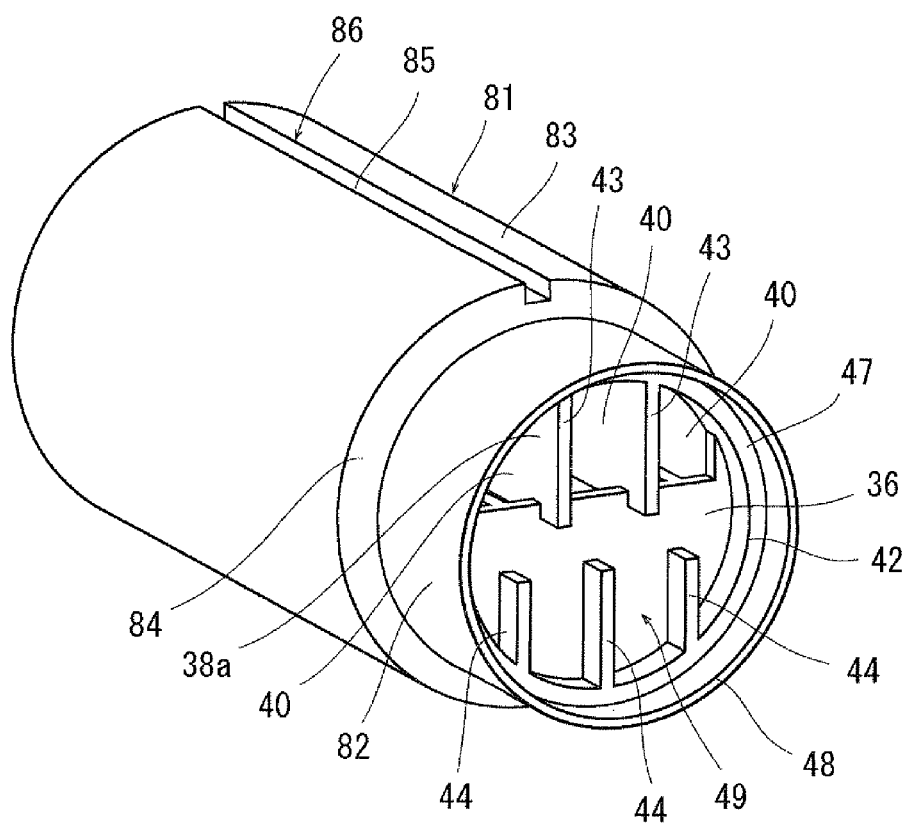
FIG. 12 is a perspective view of an example of a space forming member used in Embodiment 5 of the present invention.

When a first cylinder 7a and a second cylinder 7b are coupled with a stepped part 7c with respect to an inner wall of the second housing chamber 7, as illustrated in FIG. 12, the space forming member 81 includes a cylindrical first outer peripheral part 82 and a cylindrical second outer peripheral part 83 having an outer diameter larger than an outer diameter of the first outer peripheral part 82. The first outer peripheral part 82 has a shape abutting on the inner face of the small diameter part 15a of the space chamber 15 and the second outer peripheral part 83 has a shape abutting on the inner face of the large diameter part 15b of the space chamber 15. The first outer peripheral part 82 and the second outer peripheral part 83 are integrally coupled with a flange part 84.

Inside an end part of the first outer peripheral part 82 on a first adsorbent chamber 13 side are formed a first partition wall 36, a cylindrical part 42, top-side clearance defining members 43, bottom-side clearance defining members 44 and a filter housing part 49 configured similarly to these of Embodiments 1 to 4.

Inside an end part of the second outer peripheral part 83 on a second adsorbent chamber 17 side are formed a second partition wall 37, a cylindrical part 57, top-side clearance defining members 58, bottom-side clearance defining members 59, a cylindrical part 61, a filter housing part 62 and a flange part 64 configured similarly to these of Embodiments 1 to 4. The flange part 64 and the second outer peripheral part 83 have end faces on the second adsorbent chamber 17 side which are positioned on a same plane.

At an end part of the second outer peripheral part 83 on the top side A is formed a notch 85. At a position in the space chamber 15 corresponding to the notch 85 is formed a protrusion so as to protrude inwardly and engage with the notch 85. These notch 85 and protrusion make up a guide part 86 to limit an orientation of the space forming member 81 in the top and bottom direction (A-B direction).

Figure 13:
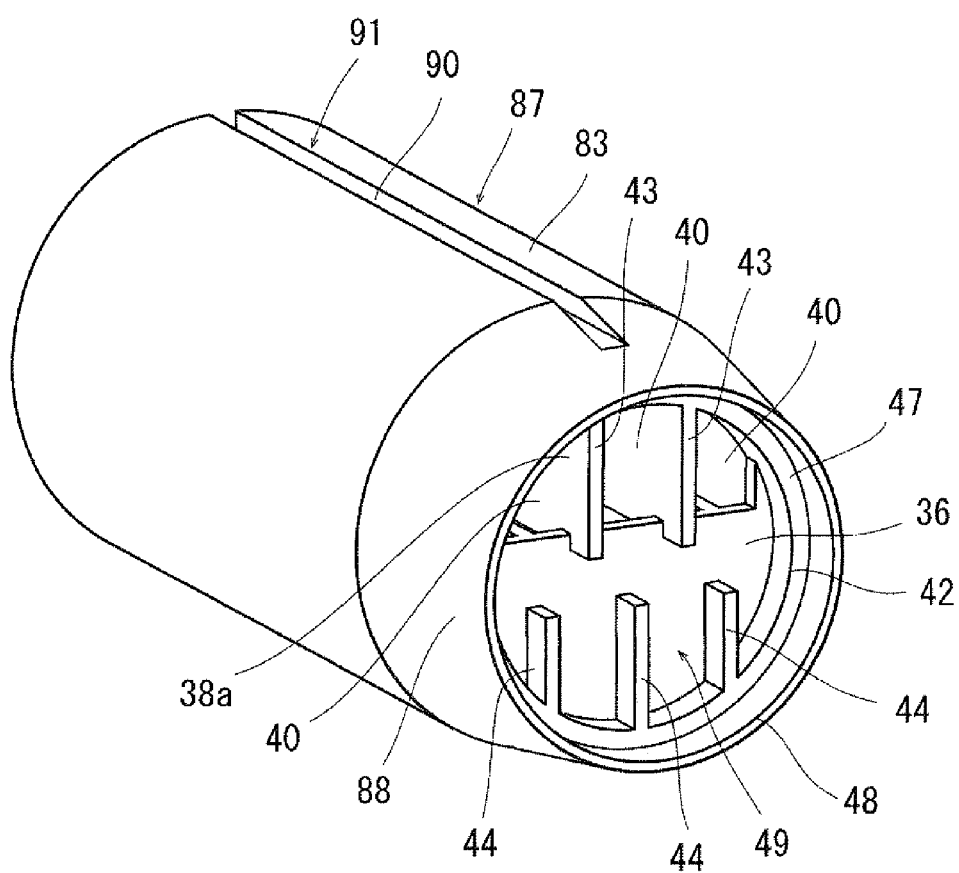
FIG. 13 is a perspective view of a modified example of a space forming member used in Embodiment 5 of the present invention.

When the first cylinder 7a and the second cylinder 7b are coupled with a tapered part in the shape of a frustum of cone on an inner wall of the second housing chamber 7, as illustrated in FIG. 13, a space forming member 87 includes a tapered part 88 in the shape of a frustum of cone and a second outer peripheral part 83 having the same diameter as the maximum diameter of the tapered part 88. The tapered part 88 has a shape abutting on the inner face of the tapered part of the second housing chamber 7, and the second outer peripheral part 83 has a shape abutting on the inner face of the large diameter part 15b of the space chamber 15.

Inside an end part of the tapered part 88 on the first adsorbent chamber 13 side are formed a first partition wall 36, a cylindrical part 42, top-side clearance defining members 43, bottom-side clearance defining members 44 and a filter housing part 49 configured similarly to these in Embodiments 1 to 4.

Inside an end part of the second outer peripheral part 83 on a second adsorbent chamber 17 side are formed a second partition wall 37, a cylindrical part 57, top-side clearance defining members 58, bottom-side clearance defining members 59, a cylindrical part 61, a filter housing part 62 and a flange part 64 configured similarly to these in Embodiments 1 to 4. The flange part 64 and the second outer peripheral part 83 have end faces on the second adsorbent chamber 17 side which are positioned on a same plane.

At an end part of the second outer peripheral part 83 and the tapered part 88 on the top side A is formed a notch 90. At a position in the space chamber 15 corresponding to the notch 90 is formed a protrusion so as to protrude inwardly and engage with the notch 90. These notch 90 and protrusion make up a guide part 91 to limit an orientation of the space forming member 87 in the top and bottom direction (A-B direction).

Between the first partition wall 36 and the second partition wall 37 is provided a coupling part 38 similar to that in Embodiments 1 to 4, with which a current control effect can be obtained similarly to that of Embodiment 1.

As in Embodiment 4, between the first partition wall 36 and the second partition wall 37 may be provided one or more partition walls 71.

Since the configuration in other points is similar to that in Embodiments 1 to 4, the description thereon is omitted. Embodiment 5 also has similar advantageous effects to those of Embodiments 1 to 4.

Embodiment 6

In Embodiments 1 to 5, the second housing chamber 7 has a circular transverse cross section that is orthogonal to the center axis X-X of the first adsorbent chamber 13, the partition walls 36, 37 and 71 have a circular outer shape, and the openings 40 and 55 have shapes in which a semicircle is divided into three parts in the transverse direction. The second housing chamber 7, however, may have an inner face of any shape in accordance with the installation position of the evaporated fuel treating device 1, and the partition walls 36, 37 and 71, the filter housing parts 49 and 62, the flange part 64, the filters 50 and 65 and the like may have outer shapes or the openings 40 and 55 may have shapes corresponding to the inner face shape of the second housing chamber 7.

Figure 14A:
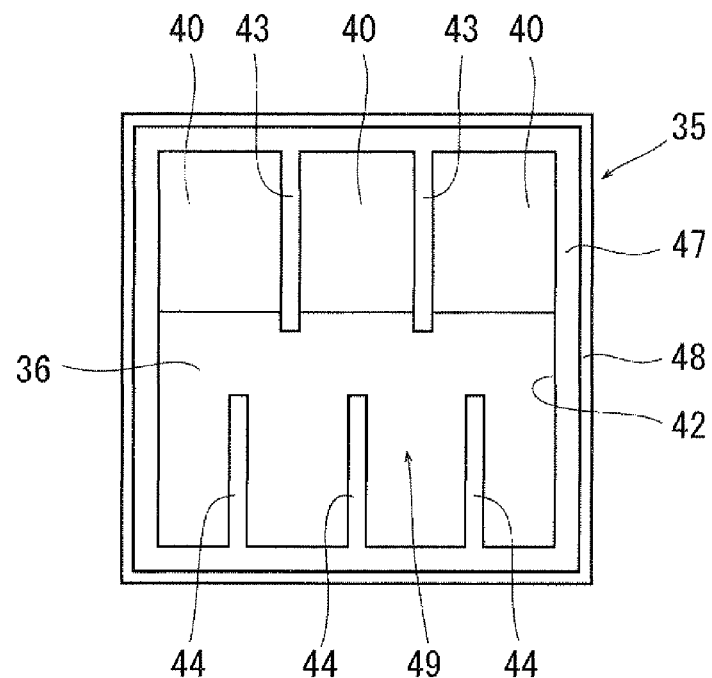
FIG. 14A illustrates a space forming member used in Embodiment 6 of the present invention in view of a first adsorbent chamber side.
Figure 14B:
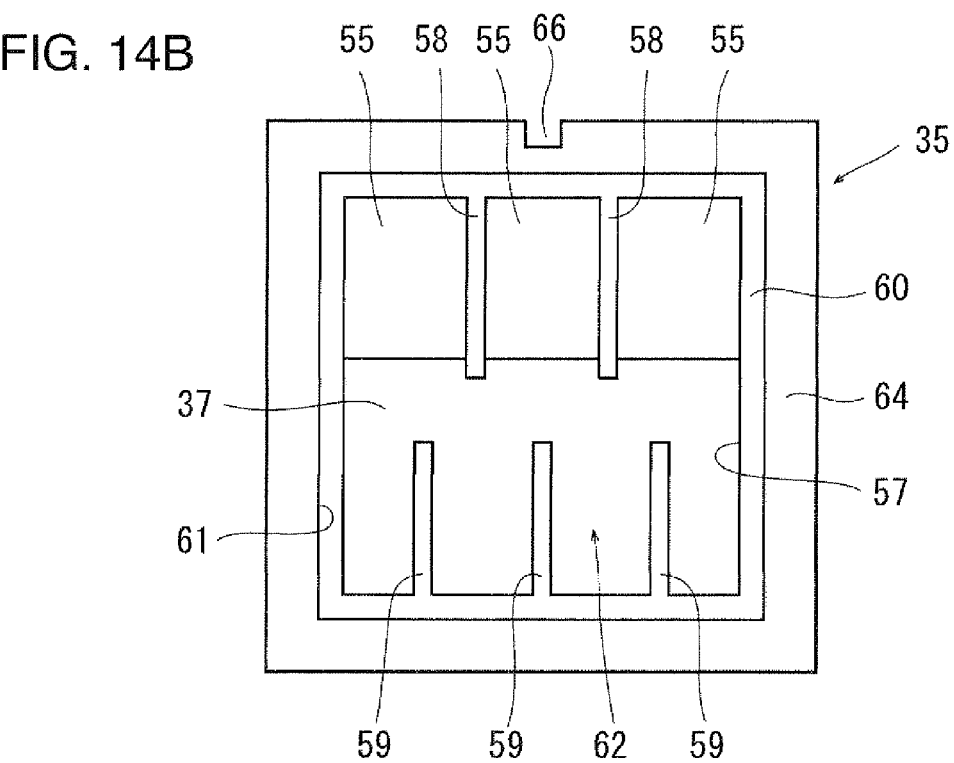
FIG. 14B illustrates the space forming member in view of a second adsorbent chamber side.

For instance, as illustrated in FIG. 14, the partition walls 36 and 37, the filter housing parts 49 and 62, the flange part 64, the filters 50 and 65 and the like may have rectangular outer shapes. Similarly to the openings 40 and 55 in Embodiments 1 to 5, on the top side A of the partition walls 36 and 37 are formed three openings 40 and 55 disposed transversely at appropriate intervals. The partition walls 36 and 37 do not have openings other than the openings 40 and 55, and the plurality of openings 40 and 55 may be formed on the top side A with reference to the center of the top and bottom direction of the partition walls 36 and 37 in an eccentric manner, and any shape and size may be set. Preferably, the total opening area of the three openings 40 (55) is set to be substantially the same as a flow path area of the atmospheric port 5 at an end part on the first adsorbent chamber 13 side.

The inner face of the second housing chamber 7 may have any shape other than the aforementioned circular and rectangular shapes, such as a polygonal shape such as a trapezoidal shape or a hexagonal shape or an elliptic shape.

Since the configuration in other points is similar to that in Embodiments 1 to 5, the description thereon is omitted. Embodiment 6 also has similar advantageous effects to those of Embodiments 1 to 5.

Embodiment 7

Figure 15:
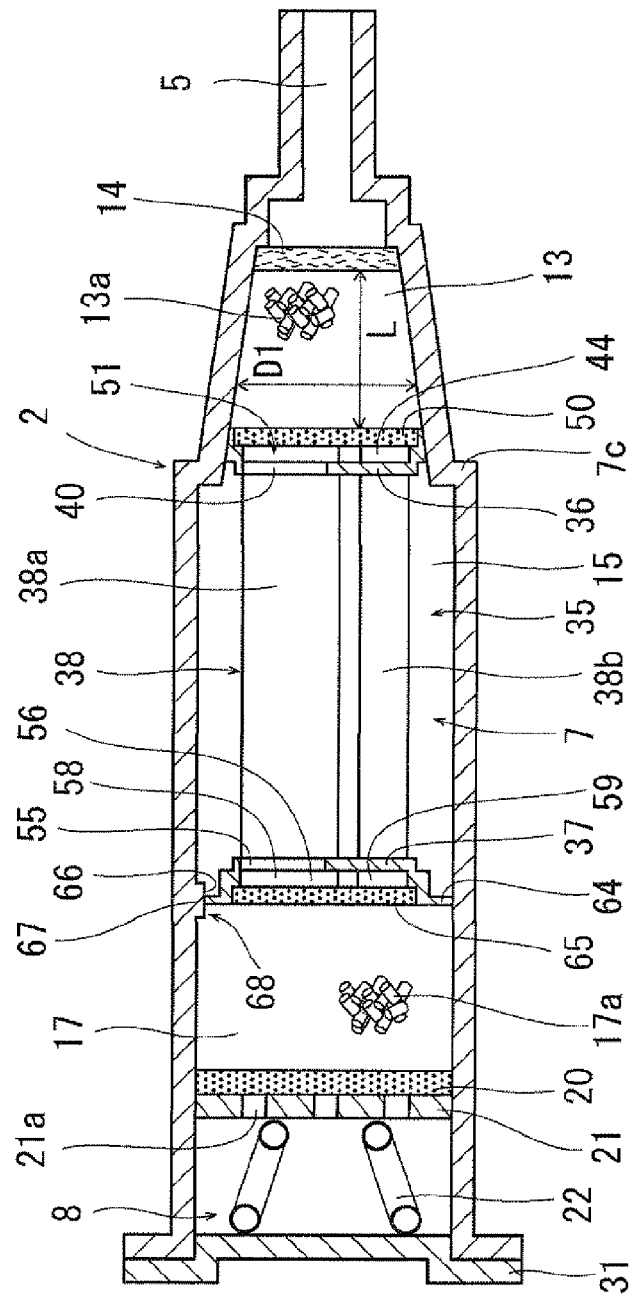
FIG. 15 is a schematic cross section of a configuration of an evaporated fuel treating device according to Embodiment 7 of the present invention, corresponding to FIG. 2 of Embodiment 1.

In Embodiments 1 to 6, the first adsorbent chamber 13 has a cross-sectional shape orthogonal to the center axis X-X of a substantially same shape along the entire center axis X-X. As illustrated in FIG. 15, although a casing 2 in the present embodiment making up the first adsorbent chamber 13 has the same outer shape of a transverse cross section orthogonal to the center axis X-X, the inner wall face of the casing 2 has a transverse cross-sectional area gradually reducing as being closer to the atmospheric port 5 side. That is, the inner wall face may be formed in a tapered shape in the center axis X-X direction so that the inner diameter D1 of the first adsorbent chamber 13 is more reduced as being closer to the atmospheric port 5 (one end part side), and is more increased as being closer to the other end part side.

Since the configuration in other points is similar to that in Embodiments 1 to 6, the description thereon is omitted. Embodiment 7 also has similar advantageous effects to those of Embodiments 1 to 6.

Since the transverse cross sectional area of the first adsorbent chamber 13 is more reduced as being closer to the atmospheric port 5, the ratio L/D1 of the length L of the first adsorbent chamber 13 to the effective cross-sectional diameter D1 at a part of the first adsorbent chamber 13 on the atmospheric port 5 side can be made larger, whereby the diffusion amount of evaporated fuel to the atmosphere can be made less.

Embodiment 8

Figure 16:
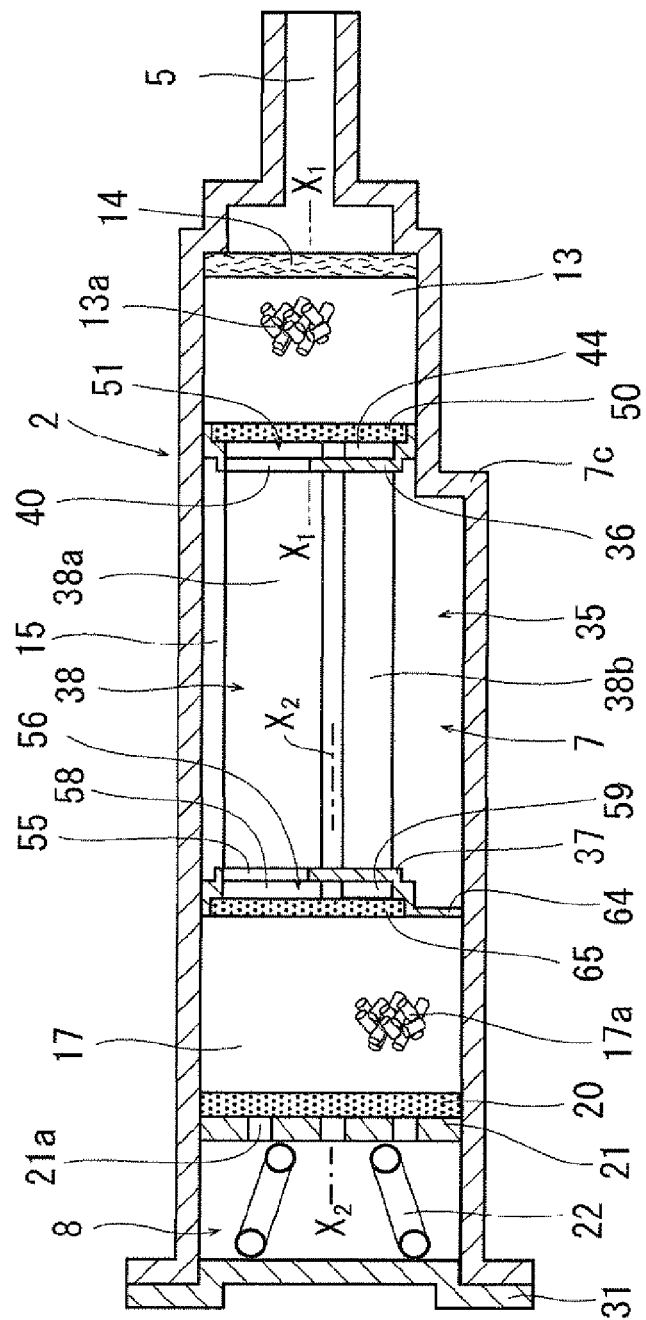
FIG. 16 is a schematic cross section of a configuration of an evaporated fuel treating device according to Embodiment 8 of the present invention, corresponding to FIG. 2 of Embodiment 1.

In Embodiments 1 to 7, the center axis X-X of the first adsorbent chamber 13 and the center axis X-X of the second adsorbent chamber 17 are collinear. As illustrated in FIG. 16, the center axis $X_1$-$X_1$ of the first adsorbent chamber 13 may be decentered from the center axis $X_2$-$X_2$ of the second adsorbent chamber 17 so that the $X_1$-$X_1$ is positioned closer to the top side A. The axis $X_1$-$X_1$ of the first adsorbent chamber 13 is substantially in parallel with the center axis $X_2$-$X_2$ of the second adsorbent chamber 17.

Since the configuration in other points is similar to that in Embodiments 1 to 7, the description thereon is omitted. Embodiment 8 also has similar advantageous effects to those of Embodiments 1 to 7.

Since the center axis $X_1$-$X_1$ of the first adsorbent chamber 13 is decentered from the center axis $X_2$-$X_2$ of the second adsorbent chamber 17 so that the $X_1$-$X_1$, is positioned closer to the top side A, the position of the first openings 40 can be closer to the top side A than that in Embodiments 1 to 7. Therefore, the ratio of evaporated fuel in the gas flowing into the first adsorbent chamber 13 through the first openings 40 can be lowered than that in Embodiments 1 to 7, whereby the diffusion amount of evaporated fuel to the atmosphere can be made less.

Embodiment 9

In Embodiments 1 to 8, the second openings 55 are provided on the top side A of the second partition wall 37. Instead, the second openings 55 may be provided over the second partition wall 37.

Since the configuration in other points is similar to that in Embodiments 1 to 8, the description thereon is omitted.

Embodiment 10

In Embodiments 1 to 9, the three adsorbent chambers 11, 13 and 17 and the space chamber 15 are provided in the casing 2 to configure the evaporated fuel treating device 1. The evaporated fuel treating device according to the present invention, however, may include any number of the adsorbent material chambers in any arrangement and any number of the space chambers in any arrangement as long as the casing 2 includes at least an atmospheric port 5, and in the casing 2 are disposed in series a first adsorbent chamber, a second adsorbent chamber and a space chamber provided between the first adsorbent chamber and the second adsorbent chamber and the first adsorbent chamber is disposed closest to the atmospheric port 5 among a plurality of adsorbent chambers.

Figure 17:
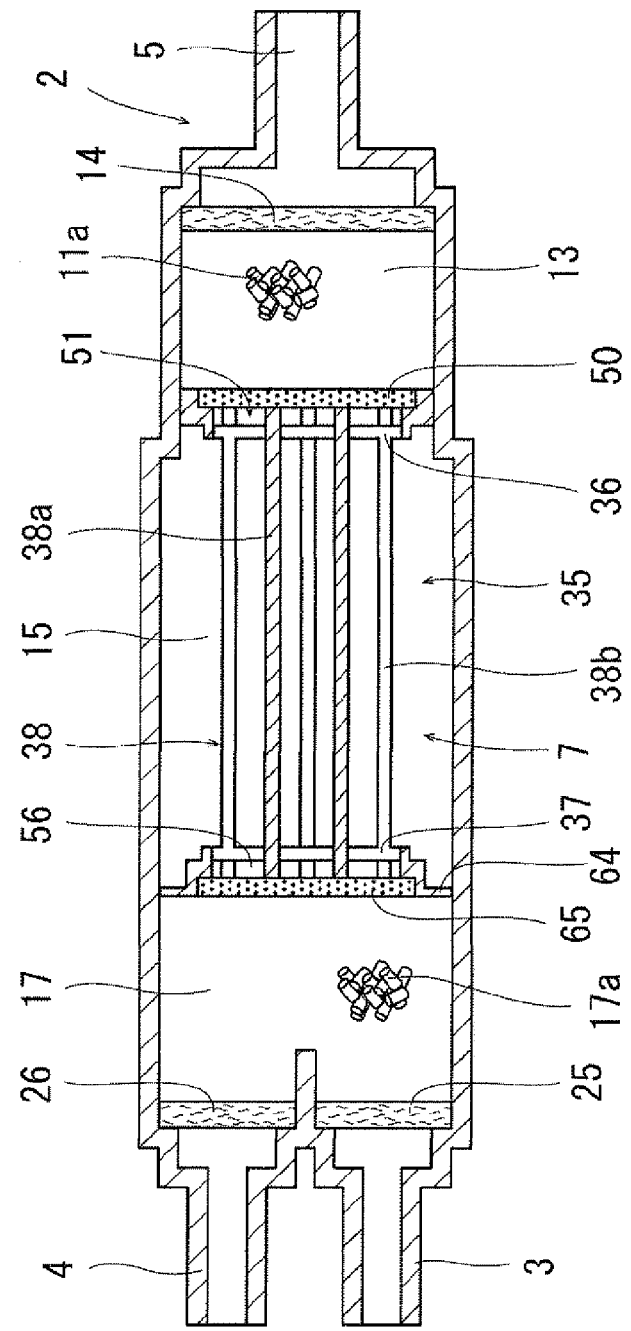
FIG. 17 is a schematic cross section of a configuration of an evaporated fuel treating device according to Embodiment 10 of the present invention, corresponding to FIG. 2 of Embodiment 1.

For instance, as illustrated in FIG. 17, the first adsorbent chamber 13, the space chamber 15 and the second adsorbent chamber 17 are linearly disposed in series in the casing 2 so as to communicate the second adsorbent chamber 17 with a tank port 3 and a purge port 4.

Figure 18:
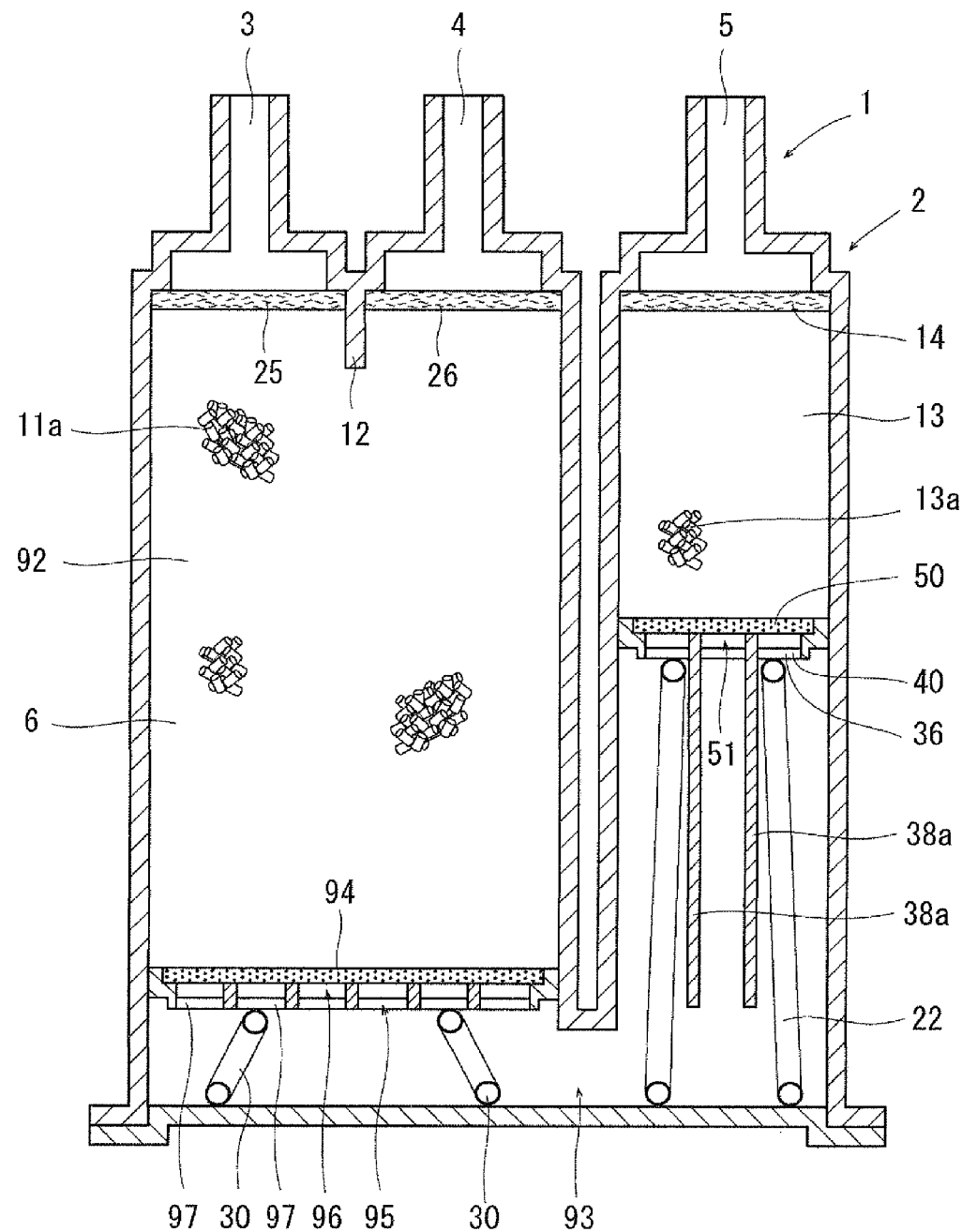
FIG. 18 is a schematic cross section of a configuration of a modified example of the evaporated fuel treating device according to Embodiment 10 of the present invention, corresponding to FIG. 2 of Embodiment 1.
Figure 19:
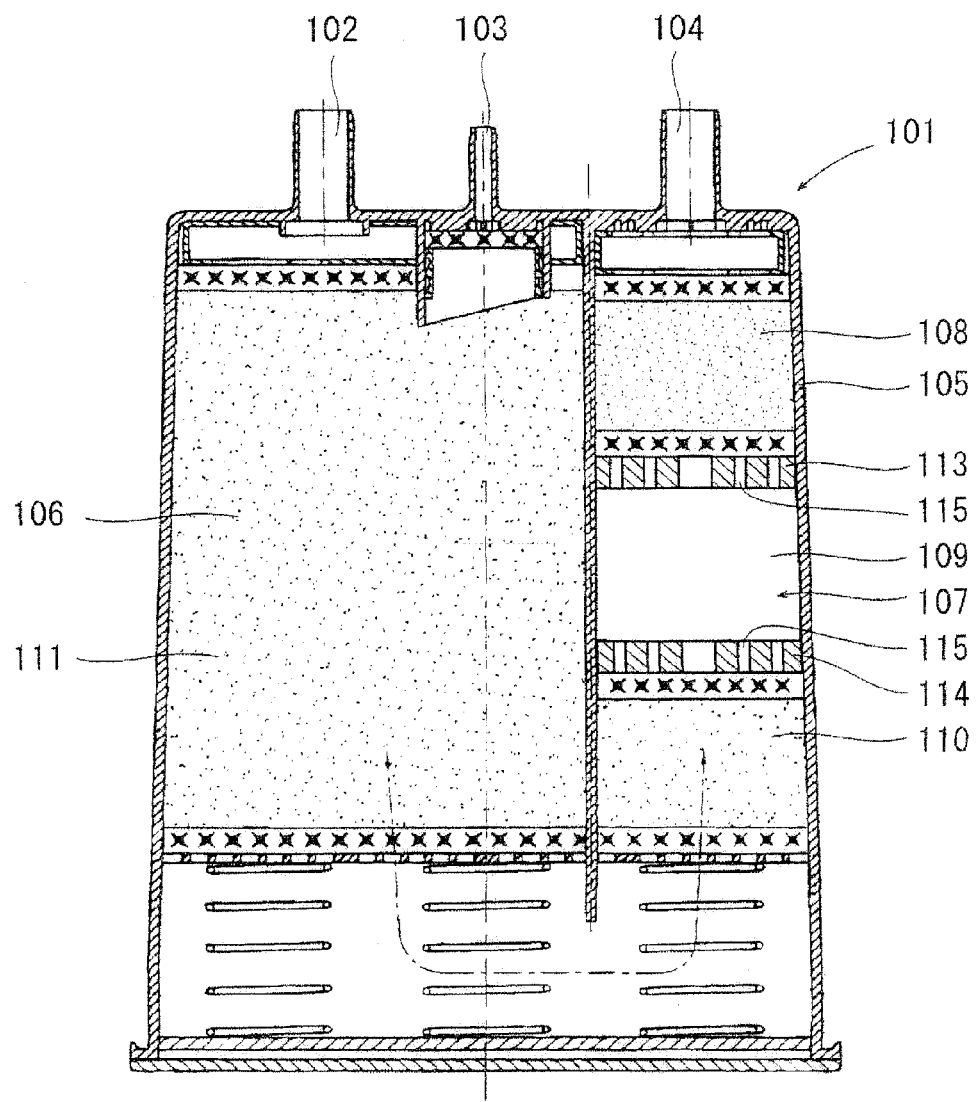
FIG. 19 is a schematic cross section of a configuration of a conventional evaporated fuel treating device.

Alternatively, as illustrated in FIG. 18, the second adsorbent chamber 17 in Embodiment 1 is not provided, and a second adsorbent chamber 92 may be provided as the third adsorbent chamber 11 in Embodiment 1 and a L-letter shaped space chamber 93 may be provided as the space chamber 15 and the space 8 in Embodiment 1. On the space chamber 93 side of the first adsorbent chamber 13 are provided a first partition wall 36, first openings 40, a filter 50 and a clearance 51, similarly to Embodiments 1 to 8. On the space chamber 93 side of the second adsorbent chamber 92 is provided a filter 94, and on the space chamber 93 side of the filter 94 is provided a second partition wall 95. Between the filter 94 and the second partition wall 95 is formed a clearance 96, and on the top side A of the second partition wall 95 are formed second openings 97. These second openings 97 are formed similarly to the second openings 55 in Embodiments 1 to 8.

Between adjacent first openings 40 and 40 is provided one end of a top-side coupling member 38a similarly to Embodiment 1, and the other end thereof is not coupled with any member unlike Embodiment 1.

In addition to the gas flow from the tank port 3 to the atmospheric port 5 like a substantial U-letter shape by returning back on the way as illustrated in FIGS. 1 and 18 and like a straight line as illustrated in FIG. 17, the flow may return back twice on the way to be in a substantial N-letter shape or may return back twice on the way to be in a substantial W-letter shape. The adsorbent chambers and the space chamber may be disposed so as to achieve these flows to configure an evaporated fuel treating device.

Since the configuration in other points is similar to that in Embodiments 1 to 9, the description thereon is omitted. Embodiment 10 also has similar advantageous effects to those of Embodiments 1 to 9.

The invention claimed is:

1. An evaporated fuel treating device comprising a casing provided with an atmospheric port, wherein in the casing are provided in series a first adsorbent chamber housing adsorbent material, a space chamber not housing adsorbent material and a second adsorbent chamber housing adsorbent material, wherein said first adsorbent chamber, said space chamber and said second adsorbent chamber are disposed so that each of said chambers is positioned beside an adjacent chamber thereof, said first adsorbent chamber is disposed closest to the atmospheric port among said adsorbent chambers housing adsorbent material, at an end part of said space chamber on a side of said first adsorbent chamber is provided a first partition wall, and at said first partition wall is provided an opening part including a plurality of first openings only, said first openings being provided to position an end face on a bottom side of the first openings on a top side with respect to a center of said first partition wall in a top and bottom direction, wherein at an end part of said space chamber on a side of said second adsorbent chamber is provided a second partition wall, and at said second partition wall is provided an opening part including a plurality of second openings only, said second openings being provided to position an end face on a bottom side of the second openings on a top side with respect to a center of the second partition wall in the top and bottom direction, said second openings being formed on corresponding positions to said first openings, and a current plate is disposed so that one end of said current plate is positioned between the adjacent first openings and a surface and a rear face of the current plate are disposed along a top and bottom direction, wherein said first partition wall and said second partition wall are coupled with a coupling part, said coupling part having top-side coupling members formed in a shape of a plate, one end of said top-side coupling members being positioned between adjacent first openings in the first partition wall, the other end being positioned between the corresponding adjacent second openings in the second partition wall, and their surface and rear-faces being disposed along the top and bottom direction, and wherein at least a part of said coupling part comprises a current plate.

2. The evaporated fuel treating device according to claim 1, wherein a space forming member including said first partition wall and said second partition wall and having a space therein is provided in said casing to form said space chamber, and wherein said first partition wall and said second partition wall are provided at opposed positions to each other.

3. The evaporated fuel treating device according to claim 1, wherein a cross-sectional area of said first adsorbent chamber in a direction orthogonal to an axial direction of said casing is smaller than a cross-sectional area of said second adsorbent chamber in the direction orthogonal to the axial direction of said casing over said first adsorbent chamber in an axial direction thereof.

4. The evaporated fuel treating device according to claim 1, further comprising a guide part to limit an orientation of said first partition wall and/or said second partition wall in the top and bottom direction.

5. The evaporated fuel treating device according to claim 1, wherein activated carbon housed in said first adsorbent chamber adsorbs less amount of evaporated fuel per unit volume than activated carbon housed in said second adsorbent chamber.

6. The evaporated fuel treating device according to claim 1, wherein a cross-sectional area of said first adsorbent chamber in a direction orthogonal to an axial direction of said casing is more reduced as being closer to said atmospheric port.

7. The evaporated fuel treating device according to claim 1, wherein an axis of said first adsorbent chamber is positioned closer to the top side than an axis of said second adsorbent chamber.

8. The evaporated fuel treating device according to claim 1, wherein said end face on the top side of the top-side coupling members is formed to position it on the end faces on the top side of the first partition wall and the second partition wall, and the end face on the bottom side of the top-side coupling members is formed to position it in an extent from the face end on the bottom side of the openings to a position higher than that of end face of the partition walls.

9. The evaporated fuel treating device according 8, wherein the coupling members further have bottom-side coupling members, an end face on a top side of the bottom-side coupling members being formed so as to position the end face on a top side thereof at an end face on the bottom side of the openings or at a position lower than the end face on the bottom side of the openings, and an end face on a bottom side of the bottom-side coupling members being formed so as to position the end face on the bottom side thereof at the end faces on the bottom side of the first partition wall and the second partition wall, and a surface and a rear-face of the bottom-side coupling members are disposed along the top and bottom direction.

* * * * *